US010934167B2

(12) United States Patent
Kang et al.

(10) Patent No.: US 10,934,167 B2
(45) Date of Patent: Mar. 2, 2021

(54) PREPARATION METHOD OF TRIFLUOROAMINE OXIDE

(71) Applicants: KOREA RESEARCH INSTITUTE OF CHEMICAL TECHNOLOGY, Daejeon (KR); SK-MATERIALS CO., LTD., Yeongju-Si (KR)

(72) Inventors: Hong Suk Kang, Daejeon (KR); In Joon Park, Daejeon (KR); Soo Bok Lee, Daejeon (KR); Won Wook So, Daejeon (KR); Shin Hong Yook, Daejeon (KR); Eun-ho Sohn, Daejeon (KR); Beom Sik Kim, Daejeon (KR); Junghun Kwak, Yeongju-si (KR); Byunghyang Kwon, Yeongju-si (KR)

(73) Assignees: KOREA RESEARCH INSTITUTE OF CHEMICAL TECHNOLOGY, Daejeon (KR); SK-MATERIALS CO., LTD., Yeongju-Si (KR)

( * ) Notice: Subject to any disclaimer, the term of this patent is extended or adjusted under 35 U.S.C. 154(b) by 0 days.

(21) Appl. No.: 16/624,752

(22) PCT Filed: May 31, 2019

(86) PCT No.: PCT/KR2019/006582
§ 371 (c)(1),
(2) Date: Dec. 19, 2019

(87) PCT Pub. No.: WO2020/105826
PCT Pub. Date: May 28, 2020

(65) Prior Publication Data
US 2020/0407223 A1 Dec. 31, 2020

(30) Foreign Application Priority Data
Nov. 23, 2018 (KR) .......................... 10-2018-0146359

(51) Int. Cl.
*C01B 21/08* (2006.01)
*C01B 21/084* (2006.01)
*B01J 3/00* (2006.01)

(52) U.S. Cl.
CPC ........... *C01B 21/0842* (2013.01); *B01J 3/006* (2013.01)

(58) Field of Classification Search
CPC ....... C01B 21/08; C01B 21/0842; B01J 3/006
USPC ...................................................... 423/386
See application file for complete search history.

(56) References Cited

U.S. PATENT DOCUMENTS

2003/0143846 A1 7/2003 Sekiya et al.
2005/0155625 A1 7/2005 Jangjian et al.

FOREIGN PATENT DOCUMENTS

| EP | 1441043 A2 | 7/2004 |
| JP | 2004511088 A | 4/2004 |
| JP | 4320389 B2 | 8/2009 |
| KR | 20080056134 A | 6/2008 |
| WO | 0225713 A1 | 3/2002 |

OTHER PUBLICATIONS

Christe, Karl O., "Oxidative Chemical Oxygenation of NF3 and Novel Synthesis of NF3O", J. Am. Chem. Soc., American Chemical Society, vol. 117, No. 22, pp. 6136-6137 (1995).

*Primary Examiner* — Edward M Johnson
(74) *Attorney, Agent, or Firm* — Lando & Anastasi, LLP

(57) ABSTRACT

The present invention relates to a preparation method of trifluoroamine oxide comprising the steps of producing an intermediate product by reacting nitrogen trifluoride and nitrous oxide in the presence of a reaction catalyst; and producing trifluoroamine oxide by reacting the intermediate product with sodium fluoride in vacuum condition up to 100 mmHg.

11 Claims, 3 Drawing Sheets

PREPARATION METHOD OF TRIFLUOROAMINE OXIDE

CROSS-REFERENCE TO RELATED APPLICATIONS

This application is a U.S. national phase application and claims the benefit of priority under 35 U.S.C. § 371 of International Patent Application Serial No. PCT/KR2019/006582, filed on May 31, 2019 and titled "PREPARATION METHOD OF TRIFLUOROAMINE OXIDE" which, in turn, claims priority to Korean Patent Application Serial No. 10-2018-0146359, filed on Nov. 23, 2018, the content of each of which is hereby incorporated herein by reference in its entirety for all purposes.

BACKGROUND OF THE INVENTION

1. Field of the Invention

The present invention relates to a preparation method of trifluoroamine oxide.

2. Description of the Related Art

A thin film preparation process such as semiconductor manufacturing has been well known as CVD (Chemical Vapor Deposition) process. In the case of forming a thin film such as a semiconductor in a CVD chamber, it is preferred to form the thin film on a designated area or on a target subject in the CVD chamber, but the thin film forming material is unnecessarily deposited on other exposed surfaces in the CVD chamber. For example, the material can be deposited on an inner wall surface of a chamber, a product fixing jig and a pipe, etc. In addition, the accumulated materials other than the target can be short-circuited in the deposition process. Such short-circuited materials or particles can contaminate the target formed or the film formed on the surface of the target to be produced. These problems lower the quality of the deposition process and also reduce the overall yield of the product. Therefore, a cleaning process is performed to remove the unnecessary deposits deposited in the chamber with a proper period. Such a cleaning process in the CVD chamber can be performed manually or by using a cleaning gas.

In general, a CVD chamber cleaning gas needs to have some basic properties. A cleaning gas should be able to clean the CVD chamber quickly. A cleaning gas should not generate harmful substances. In addition, a cleaning gas should be environmentally friendly. Up to date, perfluorinated compounds such as $CF_4$, $C_2F_6$, $SF_6$ and nitrogen trifluoride have been widely used as cleaning gases or etching gases for the deposited film in semiconductor or electronic device manufacturing processes. In particular, nitrogen trifluoride ($NF_3$) has been used the largest amount as a cleaning gas world-widely.

Such perfluorinated substances are stable materials so that they can exist in the atmosphere for a very long time. Since the used waste gas contains such perfluorinated substances that are not decomposed after being used at a high concentration, it is necessary to process such waste gas below the allowable standard value and to discharge it to the atmosphere. In addition, these conventional perfluorinated substances are known to have very high global warming potential (GWP) values (ITH: 100 years, $CO_2$ based $CF_4$: 9,200, $SF_6$: 23,900, nitrogen trifluoride: 17,200). Such gases become a considerable burden in the environment. Therefore, it is highly requested to find an alternative gas having a low GWP value and appropriate for etching or cleaning process. Even if a cleaning or an etching gas itself is environmentally friendly, it can be decomposed during cleaning or etching process, and thereby it can be changed to harmful gas such as $CF_4$ or nitrogen trifluoride. Therefore, it is important that the gas do not remain in the atmosphere for a long time after being discharged.

Nitrogen trifluoride ($NF_3$) gas is one of 6 greenhouse gases. The usage of nitrogen trifluoride is top of all those gases, which reaches approximately 50,000 tons/year worldwidely. Nitrogen trifluoride also displays a high global warming potential value. For these reasons, nitrogen trifluoride gas is recognized as the first candidate gas to be limited among global warming gases. On the other hand, nitrogen trifluoride gas is essentially used in cleaning process of semiconductor industry, which is the largest industry in Korea, and the production volume in Korean companies is the largest in the world. To implement the international treaty for reducing greenhouse gas emissions such as the Paris Agreement, and at the same time to continue the advancement of semiconductor industry in Korea, it is urgently requested to reduce the usage of nitrogen trifluoride gas and instead to develop an alternative material to replace nitrogen trifluoride.

Among the alternative gas candidates, trifluoroamine oxide ($F_3NO$) is a promising candidate to replace nitrogen trifluoride since it is easily decomposed in an aqueous solution and thus displays an extremely low GWP but shows good quality as a cleaning gas. $F_3NO$ has a very high 'F' content that affects etching and cleaning performance. Unlike non-degradable PFC, HFC, nitrogen trifluoride and $SF_6$, $F_3NO$ is easily decomposed in acid or alkali aqueous solution, so that the global warming potential thereof is estimated close to 0. It is also expected that the energy consumption and environmental burden for the treatment of unreacted residual $F_3NO$ will be small. When $F_3NO$ is leaking, it is non-irritant. $F_3NO$ displays similar properties to nitrogen trifluoride at room temperature. Therefore, $F_3NO$ is considered to have a high chance of being used as an alternative gas in primary consideration.

The preparation method of trifluoroamine oxide ($F_3NO$), an alternative gas candidate, is known to be extremely limited.

Reference document 1 (US Patent Publication No. 2003-0143846 A1) discloses a gas composition comprising $F_3NO$ as a technique relating to a gas composition for internal cleaning of a reactor and for etching a film of a silicon-containing compound.

According to the preparation method of $F_3NO$ disclosed in the document above, $NF_2OSb_2F_{11}$ salt was synthesized by reacting nitrogen trifluoride and nitrous oxide at 150° C. in the presence of $SbF_5$ catalyst, and then $F_3NO$ was synthesized by pyrolyzing $NF_2OSb_2F_{11}$ at a high temperature (>200° C.). However, the yield for the raw materials nitrogen trifluoride and nitrous oxide was as low as 20% and the document did not even mention about the purity thereof. Considering $SbF_5$, another raw material used therein, the yield was also as low as about 33%. In the case of synthesizing $F_3NO$ by using $SbF_5/NF_3/N_2O$ system, the synthesis method has not been fully approved in the aspects of risk, yield and gas purity, etc., so that the commercialization thereof is still in doubt.

SUMMARY OF THE INVENTION

In an aspect of the present invention, it is an object of the present invention to provide a preparation method of trifluoroamine oxide ($F_3NO$) with high yield by intensively studying reaction mechanisms, analysis methods, and reaction variable dependent yields which are not well known in the $SbF_5/NF_3/N_2O$ reaction system.

In another aspect of the present invention, it is also an object of the present invention to provide a method to increase yield and purity of trifluoroamine oxide in the trifluoroamine oxide preparation process.

To achieve the objects above, in an aspect of the present invention, the present invention provides a preparation method of trifluoroamine oxide comprising the following steps:

producing an intermediate product by reacting nitrogen trifluoride and nitrous oxide in the presence of a reaction catalyst; and producing trifluoroamine oxide by reacting the intermediate product with sodium fluoride in vacuum condition up to 100 mmHg.

In another aspect of the present invention, the present invention provides a method to increase yield of trifluoroamine oxide comprising the following steps:

producing an intermediate product by reacting nitrogen trifluoride and nitrous oxide in the presence of a reaction catalyst; and producing trifluoroamine oxide by reacting the intermediate product with sodium fluoride, wherein the reaction is characteristically performed in vacuum condition up to 100 mmHg.

In addition, in another aspect of the present invention, the present invention provides trifluoroamine oxide prepared by the preparation method above.

Advantageous Effect

The preparation method of trifluoroamine oxide provided in an aspect of the present invention exhibits higher yield and purity, and all the processes of producing trifluoroamine oxide are easy to understand.

DESCRIPTION OF THE PREFERRED EMBODIMENTS

Figure 1:
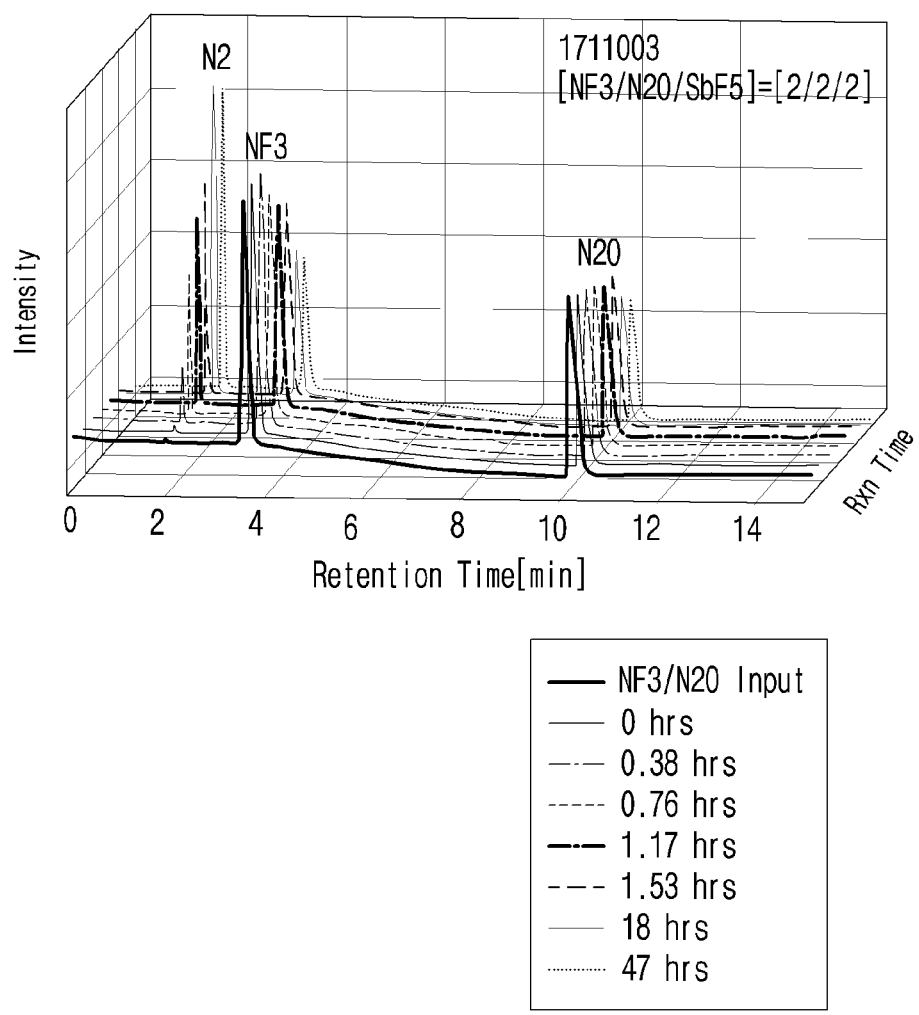
FIG. 1 is a graph illustrating the reaction gas and the produced gas in the course of $NF_2O$-salt production at the mole ratio of $NF_3/N_2O/SbF_5=[2/2/2]$, analyzed by gas chromatography (GC).
Figure 2:
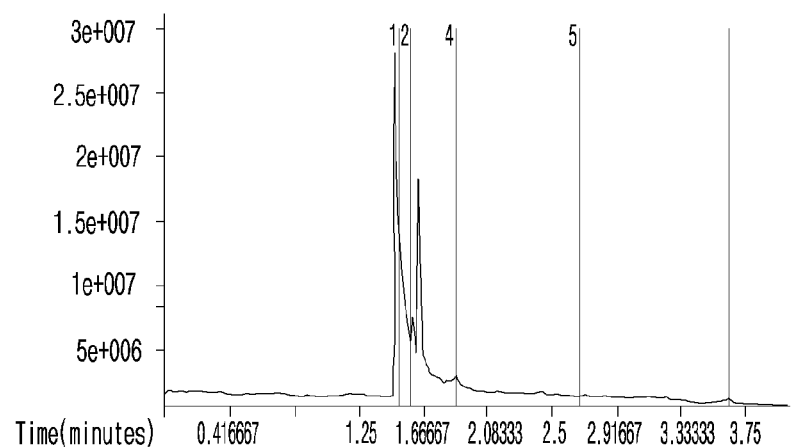
FIG. 2 is a set of graphs illustrating the results of mass spectrometry (MS) with trifluoroamine oxide ($F_3NO$) prepared in Example 1.
Figure 2:
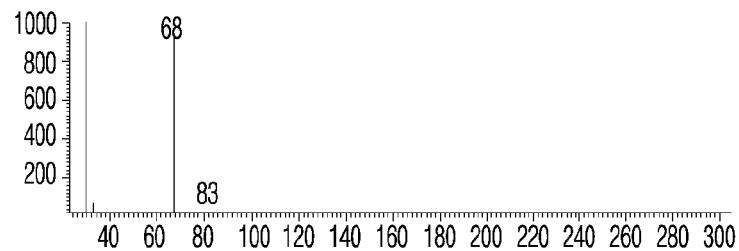
Figure 2:
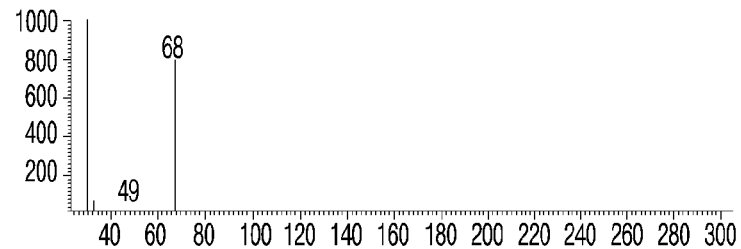
Figure 3:
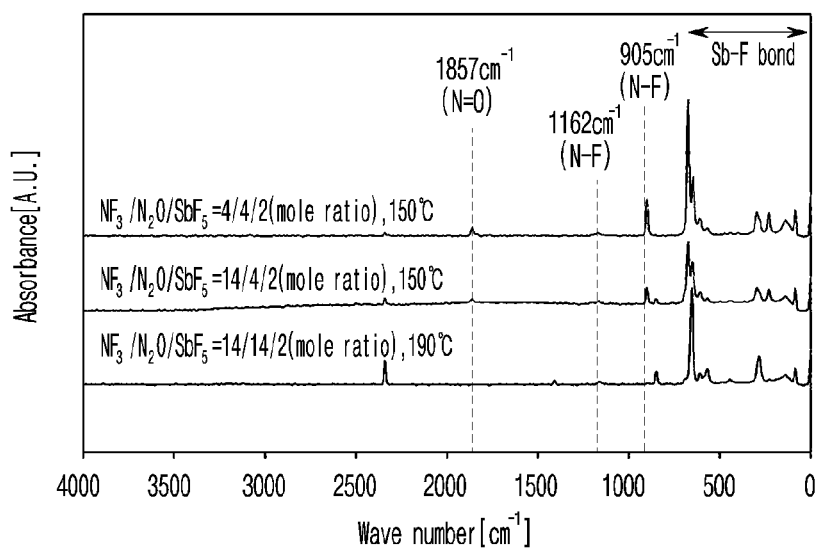
FIG. 3 is a graph illustrating the results of infrared spectroscopy (IR) with $NF_2O$-salt, an intermediate product, prepared in step 1 of Example 1.

Hereinafter, the present invention is described in detail.

In an aspect of the present invention, the present invention provides a preparation method of trifluoroamine oxide comprising the following steps:

producing an intermediate product by reacting nitrogen trifluoride and nitrous oxide in the presence of a reaction catalyst; and producing trifluoroamine oxide by reacting the intermediate product with sodium fluoride in vacuum condition up to 100 mmHg.

Hereinafter, the preparation method of trifluoroamine oxide ($F_3NO$) provided in an aspect of the present invention is described in detail, step by step.

First, the preparation method of trifluoroamine oxide provided in an aspect of the present invention comprises a step of producing an intermediate product by reacting nitrogen trifluoride and nitrous oxide in the presence of a reaction catalyst.

The step of producing an intermediate product above is performed according to the following reaction formula 1 or reaction formula 2 or reaction formula 1 and reaction formula 2. The reaction catalyst herein can be $SbF_5$. Examples of reaction formulas using the reaction catalyst above are shown below.

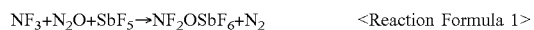

$NF_3+N_2O+SbF_5 \rightarrow NF_2OSbF_6+N_2$ <Reaction Formula 1>

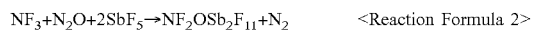

$NF_3+N_2O+2SbF_5 \rightarrow NF_2OSb_2F_{11}+N_2$ <Reaction Formula 2>

At this time, in the step of producing an intermediate product, the reaction ratio of the reaction catalyst nitrogen trifluoride nitrous oxide is preferably 2:1-10:1-10, more preferably 2:1-5:1-5, more preferably 2:2-5:2-5, and most preferably 2:3-5:3-5. The reaction ratio of the reaction catalyst nitrogen trifluoride nitrous oxide is based on the molar ratio of 2:1:1, and the molar ratio of nitrogen trifluoride and nitrous oxide can be 1-10, respectively. If the reaction ratio of the reaction catalyst nitrogen trifluoride: nitrous oxide is less than 2:1:1 (the ratio of nitrogen trifluoride and nitrous oxide is less than 1 molar ratio, respectively), the reaction catalyst such as unreacted $SbF_5$, which is highly hygroscopic and smokable, might remain and act as impurities in the reaction process of producing trifluoroamine oxide, and at the same time, it is very difficult to work due to generation of heat and fume during the pulverization process. If the reaction ratio is more than 2:10:10 (the ratio of nitrogen trifluoride and nitrous oxide is more than 10 molar ratio, respectively), the reaction pressure goes too high, resulting in the increase of reactor production costs and the risk of explosion during the reaction. So, the preferable molar ratio is 2:2:2 (reaction catalyst:nitrogen trifluoride nitrous oxide), and more preferable ratio is 2:1.2:2. That is because when the intermediate product $NF_2O$-salt is produced, the reaction catalyst and nitrogen trifluoride ($NF_3$) form a primary salt by chlorination and then react with nitrous oxide ($N_2O$). So, it is preferred to add a little excessive amount of nitrous oxide ($N_2O$) which displays a relatively lower reactivity.

In the step of producing an intermediate product, the reaction is preferably performed at a temperature between 110° C. and 150° C., more preferably at a temperature between 120° C. and 150° C., and most preferably at a temperature between 130° C. and 150° C. If the reaction temperature is lower than 110° C., which is similar to the melting point of the intermediate product $NF_2O$-salt, the solid $NF_2O$-salt is precipitated, so that stirring is difficult and absorption of nitrogen trifluoride and nitrous oxide in the gas phase is slowed, indicating that the reaction does not go smoothly. If the reaction temperature is higher than 150° C., the decomposition reaction is induced partially so that the raw materials nitrogen trifluoride and nitrous oxide might be regenerated or the byproducts such as NO and $NO_2$ might be generated, resulting in the decrease of yield. If the reaction temperature is too high, high pressure is applied to the reactor, and thereby vapor pressure of the raw materials nitrogen trifluoride and nitrous oxide also increases. Then, absorbency of the reaction catalyst existing in the liquid state is reduced as well, and thereby the production cost of the reactor goes high and the reaction rate is lowered.

The reaction of reaction formula 1 and reaction formula 2, which is the steps of producing an intermediate product proposed by the present inventors, is a gas-liquid phase reaction. That is, unlike the gas-gas reaction proposed by some prior researchers, the reaction of the invention is the gas-liquid phase reaction, wherein the intermediate catalyst $SbF_5$ in the liquid phase absorbs nitrogen trifluoride and nitrous oxide in the gas phase, leading to neutralization reaction. Therefore, the reaction temperature is preferably maintained at a temperature lower than the boiling point of $SbF_5$, 149.5° C., and it is important to maintain a minimum temperature at which stirring can be smoothly performed.

Further, in the step of producing an intermediate product, the reaction is performed in a suitable high-pressure reactor, preferably in a reactor comprising an anchor type stirring device in the size of half the inner diameter of the reactor. The absorption of nitrogen trifluoride and nitrous oxide is promoted through the reactor and the stirring is maintained preferably at a rotation speed of 50 rpm to 800 rpm for progressing smooth reaction, more preferably at a rotation speed of 100 rpm to 500 rpm, and most preferably at a rotation speed of 200 rpm to 400 rpm. If the rotation speed is less than 50 rpm, the absorption of the gaseous materials nitrogen trifluoride and nitrous oxide becomes too slow in the course of the gas-liquid phase reaction, and thereby the reaction progress goes slow, suggesting that the reactor size needs to be increased and the productivity is decreased. If the rotation speed exceeds 800 rpm, mechanical abrasion due to high-speed stirring may occur, resulting in the increase of maintenance costs.

The type of the stirrer can be exemplified by a grand seal, a mechanical seal and a magnetic drive. However, considering the reaction above is a high temperature high pressure reaction, a magnetic drive is more preferred. The material of the reactor used in the reaction can be stainless steel, hastelloy or alloy. When stainless steel is used for the reactor, it is preferred to perform passivation using $F_2$ gas before use.

In the step of producing an intermediate product, the reaction can be induced by loading nitrogen trifluoride and nitrous oxide simultaneously in the presence of a reaction catalyst. If nitrous oxide is loaded first and then nitrogen trifluoride is loaded stepwise in the presence of a reaction catalyst, indicating the reaction takes too long and the yield is very low. If nitrogen trifluoride is loaded first and then nitrous oxide is added stepwise, the yield is low.

In the step of producing an intermediate product, the progress of the reaction can be calculated by tracing the consumed source gases nitrogen trifluoride ($NF_3$) and nitrous oxide ($N_2O$), and the resulting gas nitrogen ($N_2$) by gas chromatography. In general, calibration is performed with a standard gas before calculation.

Particularly, in the step of producing an intermediate product, a process of tracking and analyzing the proportion of nitrogen trifluoride and nitrous oxide consumed and the ratio of nitrogen generated by using at least one system selected from the group consisting of gas chromatography TCD, 5% fluorocol/carbopack B column and molecularsieve capillary column during the reaction can be additionally included.

In the step of producing an intermediate product, the reaction time can be reduced by 80% or more, preferably 85% or more, compared with the prior art, which makes the reaction time to be 8~12 hours, by eliminating the unreacted gas including nitrogen ($N_2$) produced in the course of the reaction and further injecting pure nitrogen trifluoride and nitrous oxide thereto.

As an example, in the step of producing an intermediate product, the concentration of nitrogen produced by adding nitrogen trifluoride and nitrous oxide in the presence of a reaction catalyst and the concentrations of nitrogen trifluoride and nitrous oxide consumed in the reaction can be tracked. When the conversion rate of each raw material gas reaches 40% to 90%, the unreacted gas containing nitrogen is removed, and pure nitrogen trifluoride and nitrous oxide are injected.

The removal of the reaction gas containing nitrogen and the injection of the pure nitrogen trifluoride and nitrous oxide can be performed the conversion rate based on nitrogen trifluoride and/or nitrous oxide tracked during the reaction reaches 45% to 85%, preferably when it reaches 50%~85%, more preferably 65%~85%, 70%~80%, and most preferably 50%~70%. The tracking of the reaction conversion rate can be performed by gas chromatography TCD and 5% fluorocol/carbopack B column. The removal of the reaction gas containing nitrogen and the injection of the pure nitrogen trifluoride and nitrous oxide above can be tracked by gas chromatography and can be performed until there is no further pressure change. Particularly, the removal of the reaction gas containing nitrogen and the injection of the pure nitrogen trifluoride and nitrous oxide can be performed 2-6 times repeatedly, preferably 3-5 times and more preferably 3-4 times repeatedly. If performed more than three times, the removal of the reaction gas containing nitrogen and the injection of the pure nitrogen trifluoride and nitrous oxide can be performed in the second trial when the conversion rate of nitrogen trifluoride and/or nitrous oxide, tracked down in the course of the reaction, reaches 20%~45%, preferably 25%~40% and more preferably 30%~35%. In the third trial, the removal of the reaction gas containing nitrogen and the injection of the pure nitrogen trifluoride and nitrous oxide can be performed when the conversion rate of nitrogen trifluoride and/or nitrous oxide, tracked down in the course of the reaction, reaches 2%~20%, preferably 3%~10% and more preferably 3%~6%.

In the step of producing an intermediate product, it is preferable to separate nitrogen trifluoride and nitrous oxide from the reaction gas containing nitrogen to be eliminated and reuse them. The reaction gas containing nitrogen produced in the course of the step of producing an intermediate product can be subjected to a distillation process to remove nitrogen, and the raw materials nitrogen trifluoride and nitrous oxide can be separated and recycled to be used in the reaction. The recycling can be performed when the conversion rate based on initial and residual $SbF_5$ is 40%~95%, preferably 50%~90%, more preferably 60%~85%. The time taken for the conversion rate to reach the conversion rate above is only 2~3 hours, so that the reaction time to accomplish the entire conversion rate of 100% can be within 10 hours.

The preparation method of trifluoroamine oxide provided in an aspect of the present invention comprises a step of producing trifluoroamine oxide by reacting the intermediate product with sodium fluoride in vacuum condition up to 100 mmHg.

The step of producing trifluoroamine oxide ($F_3NO$) can be accomplished by the reactions of reaction formula 3 or reaction formula 4 or reaction formula 3 and reaction formula 4.

$NF_2OSbF_6 + NaF \rightarrow F_3NO + NaSbF_6$     <Reaction Formula 3>

$NF_2OSb_2F_{11} + 2NaF \rightarrow F_3NO + 2NaSbF_6$     <Reaction Formula 4>

At this time, in the step of producing trifluoroamine oxide, the reaction ratio of the intermediate product and sodium fluoride is preferably in a molar ratio of 1:1-4. Particularly, the production of trifluoroamine oxide can be accomplished according to reaction formula 3 and reaction formula 4 above, and at this time the reaction is a solid-solid reaction. Therefore, the solid-solid surface contact is very important. In the reaction proposed in the present invention, the reaction molar ratio of the reaction product $NF_2O$-salt and sodium fluoride (NaF) is preferably 1.0~4.0 based on sodium fluoride. If the amount of sodium fluoride is less than 1.0 mol, the reaction might not be completed. On the other hand, if the amount of sodium fluoride is more than 4.0 mol, which means the amount of a solid material added thereto is increased, there might be a problem in stirring. To activate the solid-solid reaction, it is important to mix $NF_2O$-salt and NaF homogeneously. If sufficient contact is not accomplished due to unsatisfactory stirring, trifluoroamine oxide ($F_3NO$) is obtained only with a very low yield. To activate the contact between the reactants, $NF_2O$-salt and NaF are thoroughly pulverized and mixed before the reaction is induced, which can increase the yield. More preferably, the raw materials are mixed, followed by pellet molding, which leads to smooth reaction.

In the step of producing trifluoroamine oxide above, the reaction is preferably performed at a temperature range of 150° C. to 200° C., more preferably 170° C. to 190° C. and most preferably 180° C. to 190° C. If the reaction temperature is lower than 150° C., the reaction rate is very slow and the reactor size must be increased. If the reaction temperature is higher than 200° C., there is a high possibility of the generation of by-products. The possible by-products can be No and $NO_2$ which can be produced from the raw materials, and nitrogen trifluoride and nitrous oxide can be produced by the reversible reaction of the raw materials.

The final product $F_3NO$ is not stable in such conditions of high temperature, high pressure and acidic atmosphere. Therefore, it is preferred to recover the product immediately after the generation. So, the pyrolysis reaction is preferably performed in vacuum condition in order to minimize the contact between the reaction product $F_3NO$ and other compounds. The vacuum condition herein is preferably up to 100 mmHg, more preferably up to 10 mmHg or 1 mmHg~100 mm Hg, and most preferably 1 mmHg~10 mm Hg. If the pressure condition is out of the above range, both yield and purity would be lowered.

Further, in the step of producing trifluoroamine oxide, the progress of the reaction can be calculated by tracing the consumed raw material gases by gas chromatography. In general, calibration is performed with a standard gas before calculation.

Particularly, in the step of producing trifluoroamine oxide, a process of tracking and analyzing the ratio of the generated $F_3NO$ and byproducts (nitrogen trifluoride, nitrous oxide and nitrogen) by using at least one system selected from the group consisting of gas chromatography TCD, 5% fluorocol/carbopack B column and molecularsieve capillary column during the reaction can be additionally included.

In another aspect of the present invention, the present invention provides a method to increase yield of trifluoroamine oxide comprising the following steps:

producing an intermediate product by reacting nitrogen trifluoride and nitrous oxide in the presence of a reaction catalyst; and producing trifluoroamine oxide by reacting the intermediate product with sodium fluoride, wherein the reaction is characteristically performed in vacuum condition up to 100 mmHg.

The method to increase yield of trifluoroamine oxide provided in another aspect of the present invention is performed in the proper reaction conditions described in the preparation method of trifluoroamine oxide above.

In particular, in the present invention, the reaction of $NF_2O$-salt, the intermediate product, with NaF is performed in vacuum condition to improve the yield of trifluoroamine oxide.

At this time, the vacuum condition herein is preferably up to 100 mmHg, more preferably up to 10 mmHg or 1 mmHg~100 mm Hg, and most preferably 1 mmHg~10 mm Hg. If the pressure condition is out of the above range, both yield and purity would be lowered.

In the step of producing trifluoroamine oxide above, the reaction is preferably performed at a temperature range of 150° C. to 200° C., more preferably 170° C. to 190° C. and most preferably 180° C. to 190° C. If the reaction temperature is lower than 150° C., the reaction rate is very slow and the reactor size must be increased. If the reaction temperature is higher than 200° C., there is a high possibility of the generation of by-products. The possible by-products can be No and $NO_2$ which can be produced from the raw materials, and nitrogen trifluoride and nitrous oxide can be produced by the reversible reaction of the raw materials.

Further, the yield of trifluoroamine oxide is preferably 40% or more, more preferably 60% or more. The purity of trifluoroamine oxide is preferably 90% or more, more preferably 92% or more, and most preferably 94% or more.

In addition, in another aspect of the present invention, the present invention provides trifluoroamine oxide prepared by the preparation method above.

The trifluoroamine oxide according to the present invention has excellent purity, so that it can be used commercially.

Practical and presently preferred embodiments of the present invention are illustrative as shown in the following Examples.

However, it will be appreciated that those skilled in the art, on consideration of this disclosure, may make modifications and improvements within the spirit and scope of the present invention.

Example 1: Preparation of Trifluoroamine Oxide Using Batch-Type High Pressure Reactor Step 1: 200 g (0.92 gmol) of antimony pentafluoride ($SbF_5$) was placed in a stainless steel 1 L high pressure reactor equipped with a magnetic drive, an anchor type stirrer and a jacket and passivated with $F_2$ gas inside. 130.6 g (1.84 gmol) of nitrogen trifluoride ($NF_3$) and 80.96 g (1.84 gmol) of nitrous oxide ($N_2O$) were simultaneously added thereto through MFC, and the reactor was tightly sealed. The stirring speed was maintained at 200 rpm and the reaction temperature was raised to 150° C.

The progress of the reaction such as reaction conversion rate was monitored by tracking $N_2$ generated and nitrogen trifluoride and nitrous oxide consumed in the reaction by using gas chromatography TCD and 5% fluorocol/carbopack B column. The total reaction time was 100 hours, and the final conversion rate was 104% based on nitrogen trifluoride and 106% based on nitrous oxide. The reaction presented by reaction formula 2 was the main reaction overall and the reaction presented by reaction formula 1 was the side reaction which took 5% by the total reaction. The consumed gas and the generated gas ($N_2$) in the course of the reaction were the same materials as expected, confirmed by MS. The amount of the produced reaction product $N_2FO$-salt was 220.9 g and thus the reaction yield based on the reaction presented by reaction formula 2 was 92% by the reaction catalyst $SbF_5$.

Step 2: The reactor used in step 1 above was disassembled and opened to recover the reaction product $NF_2O$-salt. The reaction product was mixed with 154.5 g (3.68 gmol) of sodium fluoride (NaF) and pulverized, which was loaded in the reactor. After sealing, the entire system including a condenser connected to the reactor was evacuated to 10 mmHg or less, followed by sealing again. The temperature was raised to 180° C., followed by pyrolyzing for 24 hours. As a result, trifluoroamine oxide ($F_3NO$) was obtained.

The produced $F_3NO$ and the byproducts nitrogen trifluoride, nitrous oxide and nitrogen monoxide gas were analyzed by using gas chromatography TCD, 5% fluorocol/carbopack B column and molecularsieve capillary column. The volume and pressure of the recovered vessel were measured, and the final yield based on the reaction catalyst $SbF_5$ was 60.56%. The reaction results were analyzed by gas chromatography. The purity was over 94%.

Example 2: Preparation of Trifluoroamine Oxide by Sequential Loading Method

Step 1: 200 g (0.92 gmol) of antimony pentafluoride ($SbF_5$) was placed in a stainless steel 1 L high pressure reactor equipped with a magnetic drive, an anchor type stirrer and a jacket and passivated with $F_2$ gas inside, to which 130.6 g (1.84 gmol) of nitrogen trifluoride ($NF_3$) was added through MFC. 80.96 g (1.84 gmol) of nitrous oxide ($N_2O$) was added thereafter, and the reactor was sealed. The stirring speed was maintained at 200 rpm and the reaction temperature was raised to 150° C.

The progress of the reaction such as reaction conversion rate was monitored by tracking $N_2$ generated and nitrogen trifluoride and nitrous oxide consumed in the reaction by using gas chromatography TCD and 5% fluorocol/carbopack B column. The total reaction time was 80 hours, and the final conversion rate was 85% based on nitrogen trifluoride and 85% based on nitrous oxide. The consumed gas and the generated gas ($N_2$) in the course of the reaction were the same materials as expected, confirmed by MS. The amount of the produced reaction product $N_2FO$-salt was 187.2 g and thus the reaction yield based on the reaction presented by reaction formula 2 was 78% by the reaction catalyst $SbF_5$.

Step 2: The reactor used in step 1 above was disassembled and opened to recover the reaction product $NF_2O$-salt. The reaction product was mixed with 154.5 g (3.68 gmol) of sodium fluoride (NaF) and pulverized, which was loaded in the reactor. After sealing, the entire system including a condenser connected to the reactor was evacuated to 10 mmHg or less, followed by sealing again. The temperature was raised to 180° C., followed by pyrolyzing for 24 hours. As a result, trifluoroamine oxide ($F_3NO$) was obtained.

The produced $F_3NO$ and the byproducts nitrogen trifluoride, nitrous oxide and nitrogen monoxide gas were analyzed by using gas chromatography TCD, 5% fluorocol/carbopack B column and molecularsieve capillary column. The volume and pressure of the recovered vessel were measured, and the final yield based on the reaction catalyst $SbF_5$ was 42.0%. The reaction results were analyzed by gas chromatography. The purity was over 94%.

Comparative Example 1: Preparation of Trifluoroamine Oxide by Atmospheric Pyrolysis Reaction Step 1: 200 g (0.92 gmol) of antimony pentafluoride ($SbF_5$) was placed in a stainless steel 1 L high pressure reactor equipped with a magnetic drive, an anchor type stirrer and a jacket and passivated with $F_2$ gas inside, to which 130.6 g (1.84 gmol) of nitrogen trifluoride ($NF_3$) was added through MFC. 80.96 g (1.84 gmol) of nitrous oxide ($N_2O$) was added thereafter, and the reactor was sealed. The stirring speed was maintained at 200 rpm and the reaction temperature was raised to 150° C.

The progress of the reaction such as reaction conversion rate was monitored by tracking $N_2$ generated and nitrogen trifluoride and nitrous oxide consumed in the reaction by using gas chromatography TCD and 5% fluorocol/carbopack B column. The total reaction time was 80 hours, and the final conversion rate was 85% based on nitrogen trifluoride and 85% based on nitrous oxide. The consumed gas and the generated gas ($N_2$) in the course of the reaction were the same materials as expected, confirmed by MS. The amount of the produced reaction product $N_2FO$-salt was 187.2 g and thus the reaction yield based on the reaction presented by reaction formula 2 was 78% by the reaction catalyst $SbF_5$.

Step 2: The reactor used in step 1 above was disassembled and opened to recover the reaction product $NF_2O$-salt. The reaction product was mixed with 154.5 g (3.68 gmol) of sodium fluoride (NaF) and pulverized. The pulverized mixture was loaded in the reactor, and then the reactor was sealed. The entire system including a condenser connected to the reactor was sealed at normal pressure. The temperature was raised to 180° C., followed by pyrolyzing for 24 hours. As a result, trifluoroamine oxide ($F_3NO$) was obtained.

The produced $F_3NO$ and the byproducts nitrogen trifluoride, nitrous oxide and nitrogen monoxide gas were analyzed by using gas chromatography TCD, 5% fluorocol/carbopack B column and molecularsieve capillary column. The volume and pressure of the recovered vessel were measured, and the final yield based on the reaction catalyst $SbF_5$ was 25.0%. The reaction results were analyzed by gas chromatography. The purity was over 87%.

As described above, the preparation method of trifluoroamine oxide provided in an aspect of the present invention shows higher yield and purity than any known method ever.

What is claimed is:
1. A preparation method of trifluoroamine oxide comprising the following steps:
producing an intermediate product by reacting nitrogen trifluoride and nitrous oxide in the presence of a reaction catalyst; and
producing trifluoroamine oxide by reacting the intermediate product with sodium fluoride in vacuum condition up to 100 mmHg.
2. The preparation method of trifluoroamine oxide according to claim 1, wherein the reaction ratio of the reaction catalyst, nitrogen trifluoride and nitrous oxide is in a molar ratio of 2:1-10:1-10 in the step of producing an intermediate product.
3. The preparation method of trifluoroamine oxide according to claim 1, wherein the reaction is performed preferably at a temperature range of 110° C.~150° C. in the step of producing an intermediate product.

4. The preparation method of trifluoroamine oxide according to claim 1, wherein the stirring speed in the reaction is maintained at 50 rpm~800 rpm in the step of producing an intermediate product.

5. The preparation method of trifluoroamine oxide according to claim 1, wherein the vacuum condition is a pressure condition of 1 mmHg to 100 mmHg in the step of producing trifluoroamine oxide.

6. The preparation method of trifluoroamine oxide according to claim 1, wherein the reaction ratio of the intermediate product and sodium fluoride is in a molar ratio of 1:1-4 in the step of producing trifluoroamine oxide.

7. The preparation method of trifluoroamine oxide according to claim 1, wherein the reaction is performed at a temperature range of 150° C.~200° C. in the step of producing trifluoroamine oxide.

8. A method to increase yield of trifluoroamine oxide comprising the following steps:

producing an intermediate product by reacting nitrogen trifluoride and nitrous oxide in the presence of a reaction catalyst; and producing trifluoroamine oxide by reacting the intermediate product with sodium fluoride, wherein the reaction is characteristically performed in vacuum condition up to 100 mmHg.

9. The method to increase yield of trifluoroamine oxide according to claim 8, wherein the vacuum condition is a pressure condition of 1 mmHg to 100 mmHg in the step of producing trifluoroamine oxide.

10. The method to increase yield of trifluoroamine oxide according to claim 8, wherein the reaction is performed at a temperature range of 150° C.~200° C. in the step of producing trifluoroamine oxide.

11. The method to increase yield of trifluoroamine oxide according to claim 8, wherein the yield of trifluoroamine oxide is at least 40%.

* * * * *